United States Patent
Ramsl et al.

(10) Patent No.: US 11,620,127 B2
(45) Date of Patent: Apr. 4, 2023

(54) MEASURING DOCUMENTATION COMPLETENESS IN MULTIPLE LANGUAGES

(71) Applicant: SAP SE, Walldorf (DE)

(72) Inventors: Hans-Martin Ramsl, Mannheim (DE); Priyanshu Shukla, Leiman (DE)

(73) Assignee: SAP SE, Walldorf (DE)

( * ) Notice: Subject to any disclaimer, the term of this patent is extended or adjusted under 35 U.S.C. 154(b) by 116 days.

(21) Appl. No.: 17/317,340

(22) Filed: May 11, 2021

(65) Prior Publication Data

US 2022/0365776 A1  Nov. 17, 2022

(51) Int. Cl.
| | |
|---|---|
| *G06F 8/73* | (2018.01) |
| *G06F 8/74* | (2018.01) |
| *G06F 8/75* | (2018.01) |
| *G06F 8/41* | (2018.01) |
| *G06K 9/62* | (2022.01) |

(52) U.S. Cl.
CPC ............... *G06F 8/73* (2013.01); *G06F 8/427* (2013.01); *G06F 8/74* (2013.01); *G06F 8/75* (2013.01); *G06K 9/6251* (2013.01); *G06K 9/6256* (2013.01)

(58) Field of Classification Search
CPC ... G06F 8/73; G06F 8/427; G06F 8/74; G06F 8/75; G06K 9/6251; G06K 9/6256
See application file for complete search history.

(56) References Cited

U.S. PATENT DOCUMENTS

| | | | |
|---|---|---|---|
| 9,235,493 B2* | 1/2016 | Goetsch | G06F 11/3604 |
| 10,613,844 B2* | 4/2020 | Ravindar | G06F 8/443 |
| 2007/0168959 A1* | 7/2007 | Bayari | G06Q 10/10 |
| | | | 717/110 |
| 2010/0146491 A1* | 6/2010 | Hirano | G06F 8/73 |
| | | | 717/137 |

(Continued)

OTHER PUBLICATIONS

Hummel, Benjamin, "McCabe's Cyclomatic Complexity and Why We Don't Use It", CQSE GMBH, [Online]. Retrieved from the Internet: URL: https: www.cqse.eu en blog mccabe-cyclomatic-complexity , (5 20 14), 9 pgs.

*Primary Examiner* — Wei Y Zhen
*Assistant Examiner* — Amir Soltanzadeh
(74) *Attorney, Agent, or Firm* — Schwegman Lundberg & Woessner, P.A.

(57) ABSTRACT

Source code is analyzed to identify components. The components are each assigned a complexity score. Documentation for the source code is identified, related to the components, and given a score based on the quantity of the documentation for the component and the complexity score for the component. To determine semantic meaning of the documentation, vector embeddings for the documentation languages may be generated and aligned. Alignment causes the different machine learning models to generate similar vectors for semantically similar words in the different languages. Since the vectors of the words of the other languages are similar to the vectors of the words in a primary language with similar meanings, the vector representation of the documentation in the other languages will match the vector representation of the source code when the documentation is substantially on the same topic.

20 Claims, 15 Drawing Sheets

(56) References Cited

U.S. PATENT DOCUMENTS

| | | | |
|---|---|---|---|
| 2010/0162093 A1* | 6/2010 | Cierniak | G06F 16/951 |
| | | | 715/205 |
| 2020/0218746 A1* | 7/2020 | Fan | G06N 3/0454 |
| 2021/0011712 A1* | 1/2021 | Grant | G06F 11/3616 |
| 2021/0357210 A1* | 11/2021 | Clement | G06N 3/0454 |
| 2022/0309159 A1* | 9/2022 | Bodziony | G06F 21/568 |

* cited by examiner

```
PACKAGE COM.MULTIDOCU.LANG;                      ← 505    ← 500

IMPORT JAVA.UTIL.COLLECTIONS;
IMPORT JAVA.UTIL.LIST;

/**                            ← 540
 * THE TYPE WORLD.
 * EXTENDS PARENTWORLD AND IMPLEMENTS WORKINGWORLD
 */           ← 510
PUBLIC CLASS WORLD EXTENDS PARENTWORLD IMPLEMENTS WORKINGWORLD {
                   ← 515
    PRIVATE CLASS SUBWORLD {

/**                  ← 545
     * THE SUB POPULATION
     */           ← 520
    PUBLIC INT SUBPOPULATION;

/**                                 ← 550
     * INSTANTIATES A NEW SUB WORLD
     * INSTANZIIERT EINE NEUE UNTERWELT
     *
     * @PARAM SUBPOPULATION THE SUB POPULATION
     */            ← 525
    PUBLIC SUBWORLD (INT SUBPOPULATION) {
       THIS.SUBPOPULATION = SUBPOPULATION;
    }
  }
                           ← 530
  PRIVATE INT POPULATION;

/**        ← 555
   * THE AREA
   */           ← 535
  PUBLIC LONG AREA;
  ...
}
```

| ENGLISH MAPPING TABLE ||
|---|---|
| WORD | VECTOR |
| DATA | (0, 0.1, 0, 0.2, ...) |
| LOGIN | (0.1, 0, 0.15, ...) |
| SERVER | (0, 0, 0.1, 0.1, ...) |

| GERMAN MAPPING TABLE ||
|---|---|
| WORD | VECTOR |
| DATEN | (0, 0.1, 0, 0.2, ...) |
| ANMELDUNG | (0.1, 0, 0.15, ...) |
| SERVER | (0, 0, 0.1, 0.1, ...) |

| ENGLISH COVERAGE TABLE ||
|---|---|
| ELEMENT ID | COVERAGE |
| 1 | 6 |
| 2 | 0 |
| 3 | 0 |

| GERMAN COVERAGE TABLE ||
|---|---|
| ELEMENT ID | COVERAGE |
| 1 | 0 |
| 2 | 0 |
| 3 | 0 |

| COMPLEXITY TABLE ||||
|---|---|---|---|---|
| ELEMENT | ID | PARENT ID | COMPLEXITY | WEIGHT |
| WORLD | 1 | NULL | 8 | 0.4211 |
| SUBWORLD | 2 | 1 | 5 | 0.2633 |
| POPULATION | 3 | 1 | 1 | 0.0526 |
| AREA | 4 | 1 | 1 | 0.0526 |
| SUBPOPULATION | 5 | 2 | 1 | 0.0526 |
| SUBWORLD | 6 | 2 | 2 | 0.1052 |
| SUBPOPULATION | 7 | 6 | 1 | 0.0526 |

| DOCUMENTATION SYNTACTIC DENSITY TABLE | | |
|---|---|---|
| ELEMENT ID | LANGUAGE | DOCUMENTATION DENSITY |
| 1 | ENGLISH | 0.000519 |
| 2 | ENGLISH | 0.05213 |
| 3 | ENGLISH | 0.0625 |

820, 830A, 830B, 830C

840

| SEMANTIC DENSITY TABLE | | |
|---|---|---|
| ELEMENT ID | LANGUAGE | SIMILARITY |
| 1 | ENGLISH | 0.00002 |
| 2 | ENGLISH | 0.8121 |
| 3 | ENGLISH | 0.0031 |

*FIG. 8*

MEASURING DOCUMENTATION COMPLETENESS IN MULTIPLE LANGUAGES

TECHNICAL FIELD

The subject matter disclosed herein generally relates to automatic evaluations of completeness of documentation of application source code. Specifically, the present disclosure addresses systems and methods to measure documentation completeness of the source code in multiple languages.

BACKGROUND

Developers generally recognize that thorough documentation of source code is important, but also tend to neglect documentation efforts. Effectiveness of the resulting computer program is measured using test harnesses, but automated tools for checking documentation are minimal or non-existent.

BRIEF DESCRIPTION OF THE DRAWINGS

FIG. 5 is an illustration of example source code with embedded documentation, suitable for measuring documentation completeness.

FIGS. 6-8 are block diagrams of an example database schema, suitable for use in measuring documentation completeness in multiple languages.

DETAILED DESCRIPTION

Figure 1:
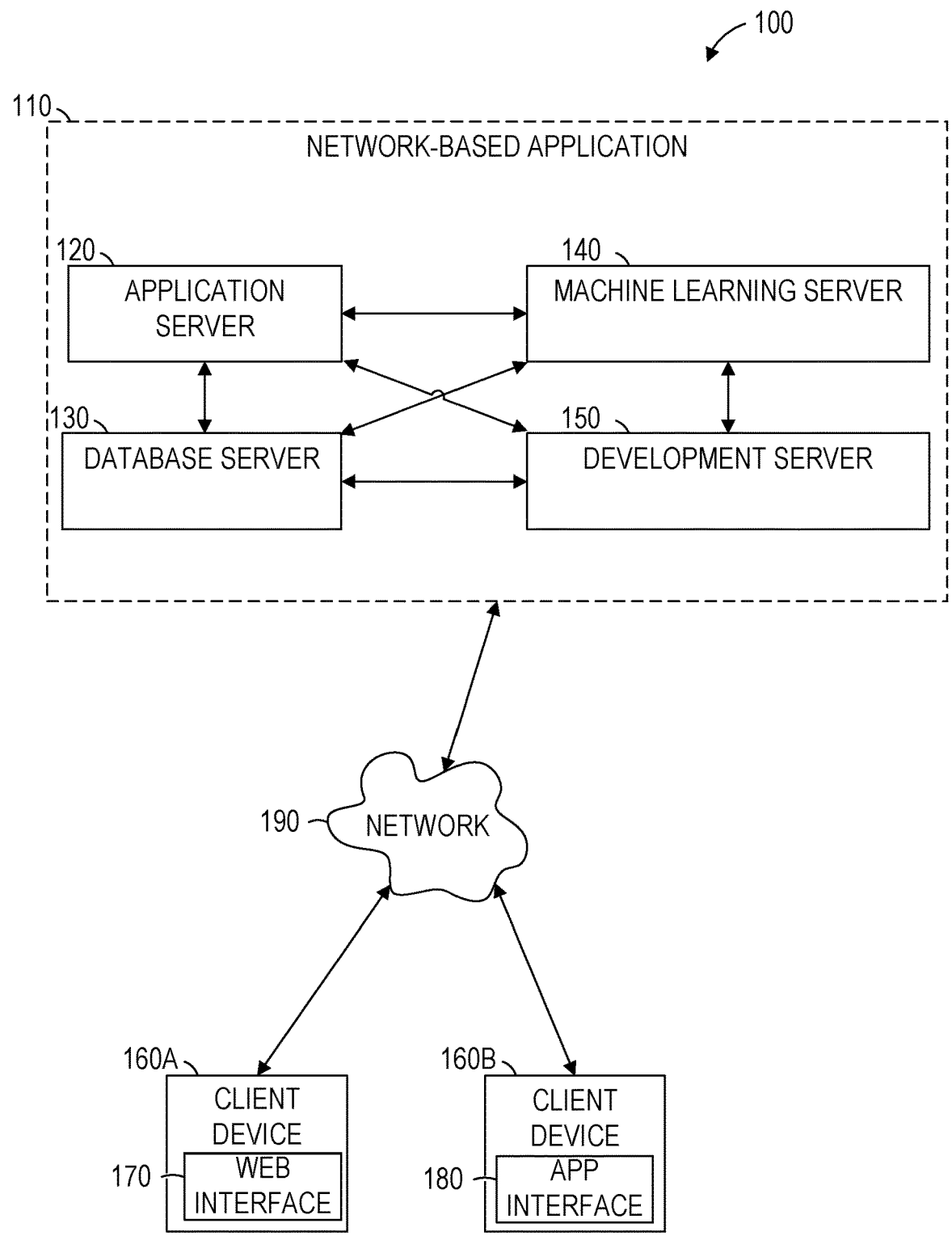
FIG. 1 is a network diagram illustrating an example network environment suitable for measuring documentation completeness in multiple languages.

Example methods and systems are directed to measuring documentation completeness in multiple languages. Source code is analyzed to identify components such as variables, functions, classes, methods, and statements. The components are each assigned a complexity score. Documentation for the source code is identified and related to the components. The documentation for each component is given a weighted score based on the quantity of the documentation for the component and the complexity score for the component.

The documentation may be present in multiple languages. In this case, the documentation for each component in each language may be given a weighted score based on the quantity of the documentation in the language for the component, the complexity score for the component, the quantity of the documentation in a reference language (e.g., English or German) for the component, or any suitable combination thereof.

Rather than basing the documentation scores based on the quantity of the documentation alone, a qualitative analysis of the contents of the documentation may also be performed. The words of the documentation may be converted to vectors using a machine learning model. The words of the source code may also be converted to vectors using the machine learning model. When the machine learning model has been trained to perform the conversion such that semantically similar words have similar vectors, further analysis performed on the vectors has the effect of analyzing the semantic meanings of the underlying texts. A measure of the quality of the documentation is thus the similarity of the vectors of the documentation to the vectors of the source code.

When training the machine learning models for different languages, the machine learning models may be aligned. Alignment causes the different machine learning models to generate similar vectors for semantically similar words in the different languages. While the documentation in a primary language (e.g., English) may include words that are similar to the words of the source code in the sense that various substrings of the documentation match various substrings of the source code, this primitive level of matching will not hold for other languages. Since the vectors of the words of the other languages are similar to the vectors of the words in the primary language with similar meanings, the vector representation of the documentation in the other languages will match the vector representation of the source code when the documentation is substantially on the same topic.

By comparison with existing methods of measuring documentation completeness, the methods and systems discussed herein improve functionality by measuring documentation completeness in multiple languages and analyzing the quality of the documentation semantically. Additionally, methods and systems discussed herein reduce the level of effort expended in measuring documentation completeness and in acting on the measurements When these effects are considered in aggregate, one or more of the methodologies described herein may obviate a need for certain efforts or resources that otherwise would be involved in measuring documentation completeness. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating an example network environment 100 suitable for measuring documentation completeness in multiple languages. The network environment 100 includes a network-based application 110, client devices 160A and 160B, and a network 190. The network-based application 110 is provided by application server 120 in communication with a database server 130, a machine learning server 140, and a development server 150. The application server 120 accesses application data (e.g., application data stored by the database server 130) to provide one or more applications to the client devices 160A and 160B via a web interface 170 or an application interface 180.

The application server 120, the database server 130, the machine learning server 140, the development server 150, and the client devices 160A and 160B may each be implemented in a computer system, in whole or in part, as described below with respect to FIG. 15. The client devices 160A and 160B may be referred to collectively as client devices 160 or generically as a client device 160.

Software developers use the development server 150 to create source code and documentation. The source code is deployed to the application server 120 to provide the one or more applications to the client devices 160A and 160B. The development server 150 measures the documentation completeness in multiple languages to encourage the software developers to provide complete documentation.

The machine learning server 140 accesses training data from the database server 130. Using the training data, the machine learning server 140 trains a machine learning model that is used by the development server 150 to measure documentation completeness of source code. The machine learning server 140 creates monolingual embeddings for each natural language (e.g., English, German, and French, and as distinguished from programming languages such as C, Java, and Python). The Python library MUSE: Multilingual Unsupervised and Supervised Embeddings may be used to generate the monolingual embeddings, to create an alignment between the monolingual embeddings using bilingual dictionaries, or both. As used herein, "embedding" refers to the conversion of human-readable words into multidimensional vectors suitable for computer processing. The vectors may be of one hundred dimensions or more, and thus are not suitable for manual calculation. Training of the natural language embeddings may be supervised or unsupervised. Supervised training takes labeled data as input. Unsupervised training learns from unlabeled data.

The development server 150, either automatically or in response to an instruction received from a user, analyzes the source code to identify code components and to determine a weight for each component. The development server 150 also analyzes the documentation for the source code to determine scores based on the quantity and relevance of documentation for each component in each of multiple natural languages. Based on the weight for the components and the corresponding scores, a user interface is presented that informs the user of the completeness of the documentation and allows the user to update the documentation.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 15. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 130, the machine learning server 140, the development server 150, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
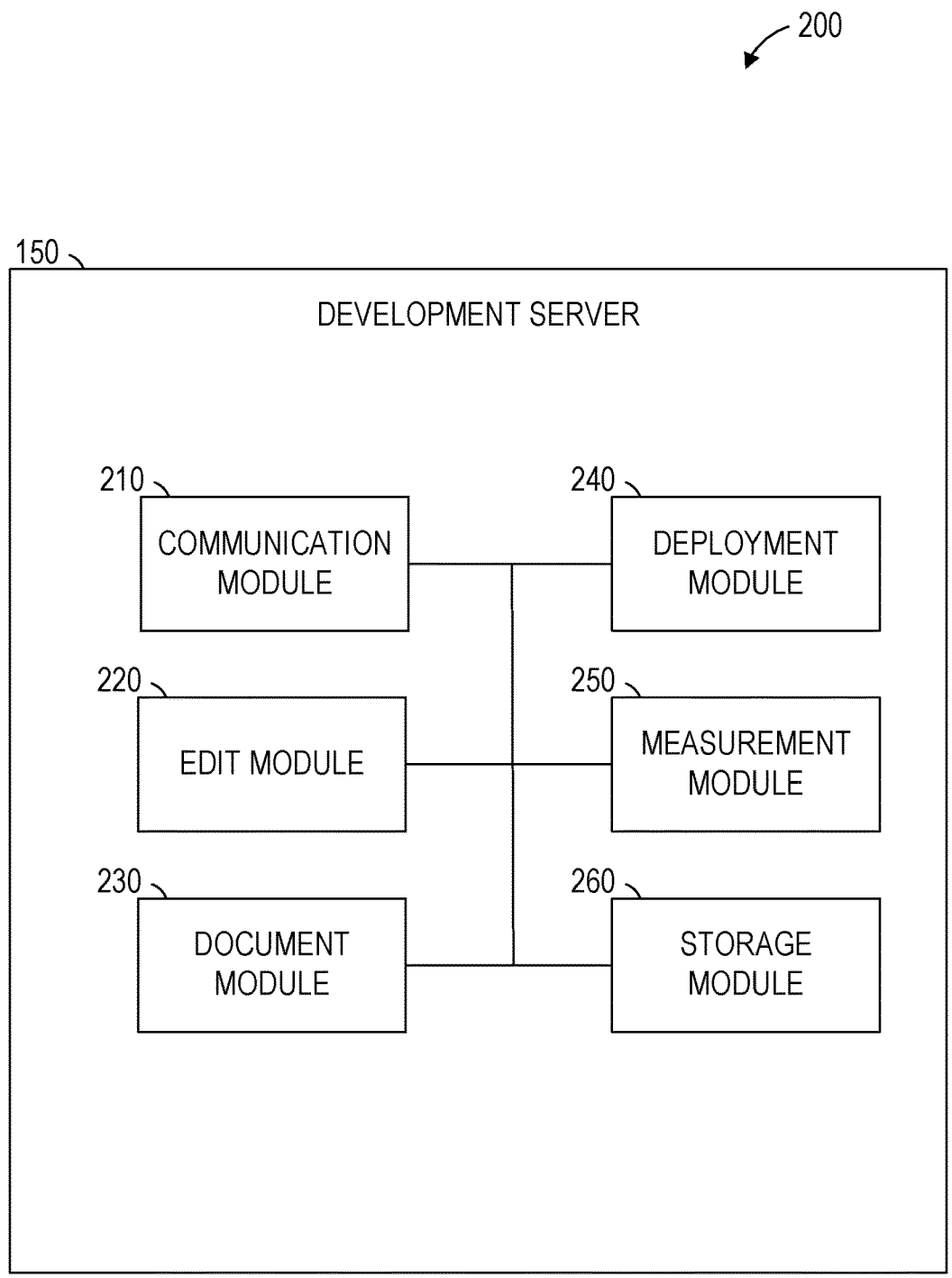
FIG. 2 is a block diagram of an example development server, suitable for editing source code and documentation.

FIG. 2 is a block diagram 200 of the example development server 150, suitable for pretraining components of a machine learning model using unlabeled data. The development server 150 is shown as including a communication module 210, an edit module 220, a document module 230, a deployment module 240, a measurement module 250, and a storage module 260, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the development server 150 and transmits data from the development server 150. For example, the communication module 210 may receive, from the client device 160A or 160B, text for source code or documentation. The source code and documentation may be stored locally on the development server 150 (e.g., on a hard drive) or in remote storage (e.g., a network storage device) via the storage module 260. Communications sent and received by the communication module 210 may be intermediated by the network 190.

The edit module 220 provides user interfaces to edit and view source code. The document module 230 provides user interfaces to edit and view documentation for the source code. The deployment module 240 deploys the source code to the application server 120. For example, source code may be compiled into one or more executable files and the executable files transferred to the application server 120 via the network 190.

The development server 150 measures the completeness of the documentation of the source code in multiple languages using the measurement module 250. The measurement module 250 may generate a score for the completeness of the documentation of each component of the source code in each of the multiple languages. The score may be generated in response to editing (via the edit module 220) of the source code, in response to editing (via the document module 230) of the documentation, in response to a command received via an interactive user interface, at a predetermined time (e.g., daily at midnight), or any suitable combination thereof.

Figure 3:
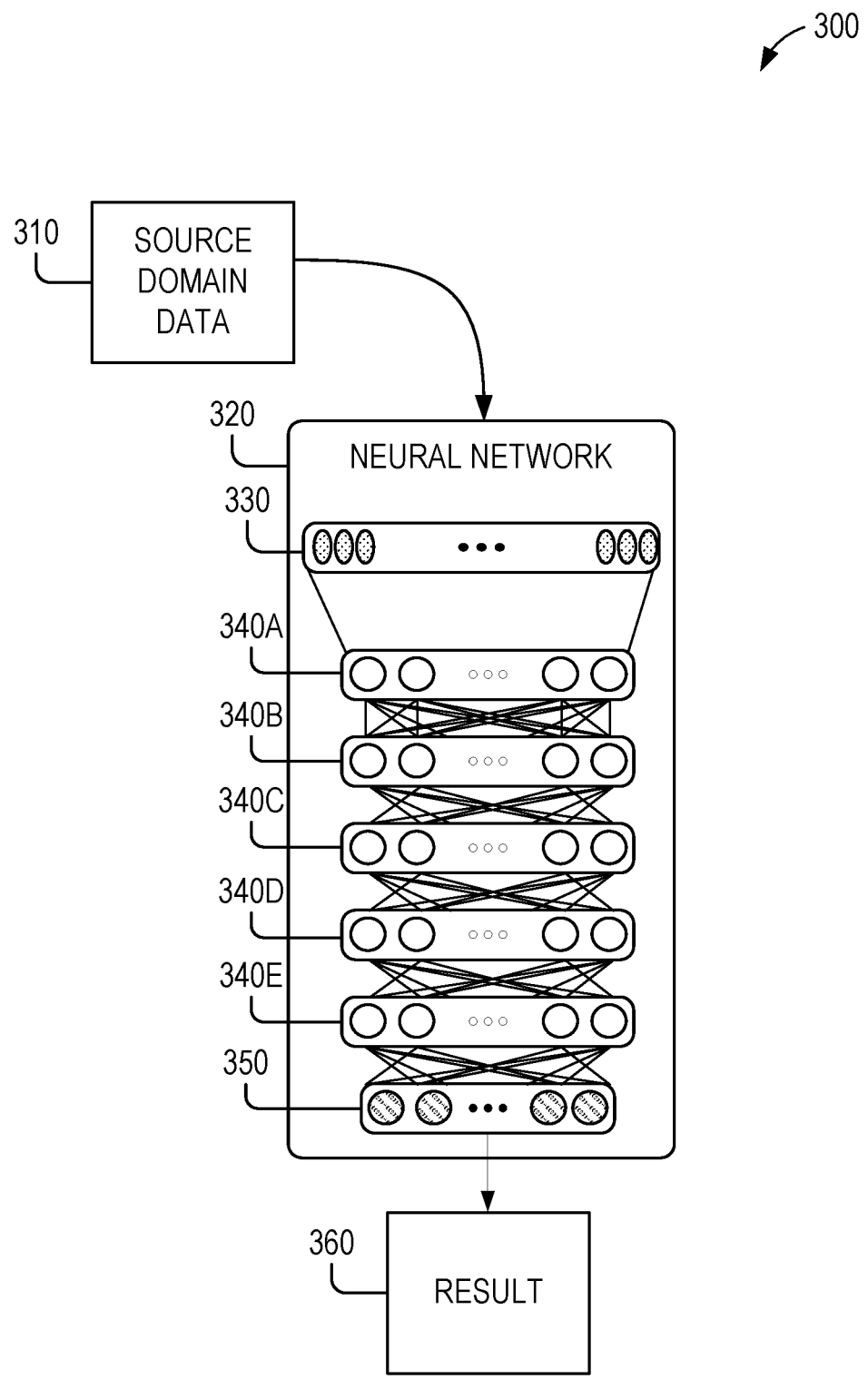
FIG. 3 is a block diagram of an example neural network, suitable for use in generating vector representations of documentation.

FIG. 3 illustrates the structure of an example neural network 320. The neural network 320 takes source domain data 310 as input, processes the source domain data 310 using the input layer 330; the intermediate, hidden layers 340A, 340B, 340C, 340D, and 340E; and the output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 340 is the result 360. The intermediate layers 340A-340E are referred to as "hidden" because they do not interact directly with either the input or the output, and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. The number of epochs may be 10, 100, 500, 1000, or another number. Within an epoch, one or more batches of the training dataset are used to train the model. Thus, the batch size ranges between 1 and the size of the training dataset while the number of epochs is any positive integer value. The model parameters are updated after each batch (e.g., using gradient descent).

In a supervised learning phase, a model is developed to predict the output for a given set of inputs, and is evaluated over several epochs to more reliably provide the output that is specified as corresponding to the given input for the greatest number of inputs for the training dataset. The training dataset comprises input examples with labeled outputs. For example, a user may label images based on their content and the labeled images used to train an image identifying model to generate the same labels.

For self-supervised learning, the training dataset comprises self-labeled input examples. For example, a set of color images could be automatically converted to black-and-white images. Each color image may be used as a "label" for the corresponding black-and-white image, and used to train a model that colorizes black-and-white images. This process is self-supervised because no additional information, outside of the original images, is used to generate the training dataset. Similarly, when text is provided by a user, one word in a sentence can be masked and the network trained to predict the masked word based on the remaining words.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. The finalized models may be evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusters is used to select a model that produces the clearest bounds for its clusters of data.

The neural network 320 may be a deep learning neural network, a deep convolutional neural network, a recurrent neural network, or another type of neural network. A neuron is an architectural element used in data processing and artificial intelligence, particularly machine learning. A neuron implements a transfer function by which a number of inputs are used to generate an output. The inputs may be weighted and summed, with the result compared to a threshold to determine if the neuron should generate an output signal (e.g., a 1) or not (e.g., a 0 output). Through the training of a neural network, the inputs of the component neurons are modified. One of skill in the art will appreciate that neurons and neural networks may be constructed programmatically (e.g., via software instructions) or via specialized hardware linking each neuron to form the neural network.

An example type of layer in the neural network 320 is a Long Short Term Memory (LSTM) layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

The structure of each layer may be predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, deep neural networks, genetic or evolutionary algorithms, and the like.

Figure 4:
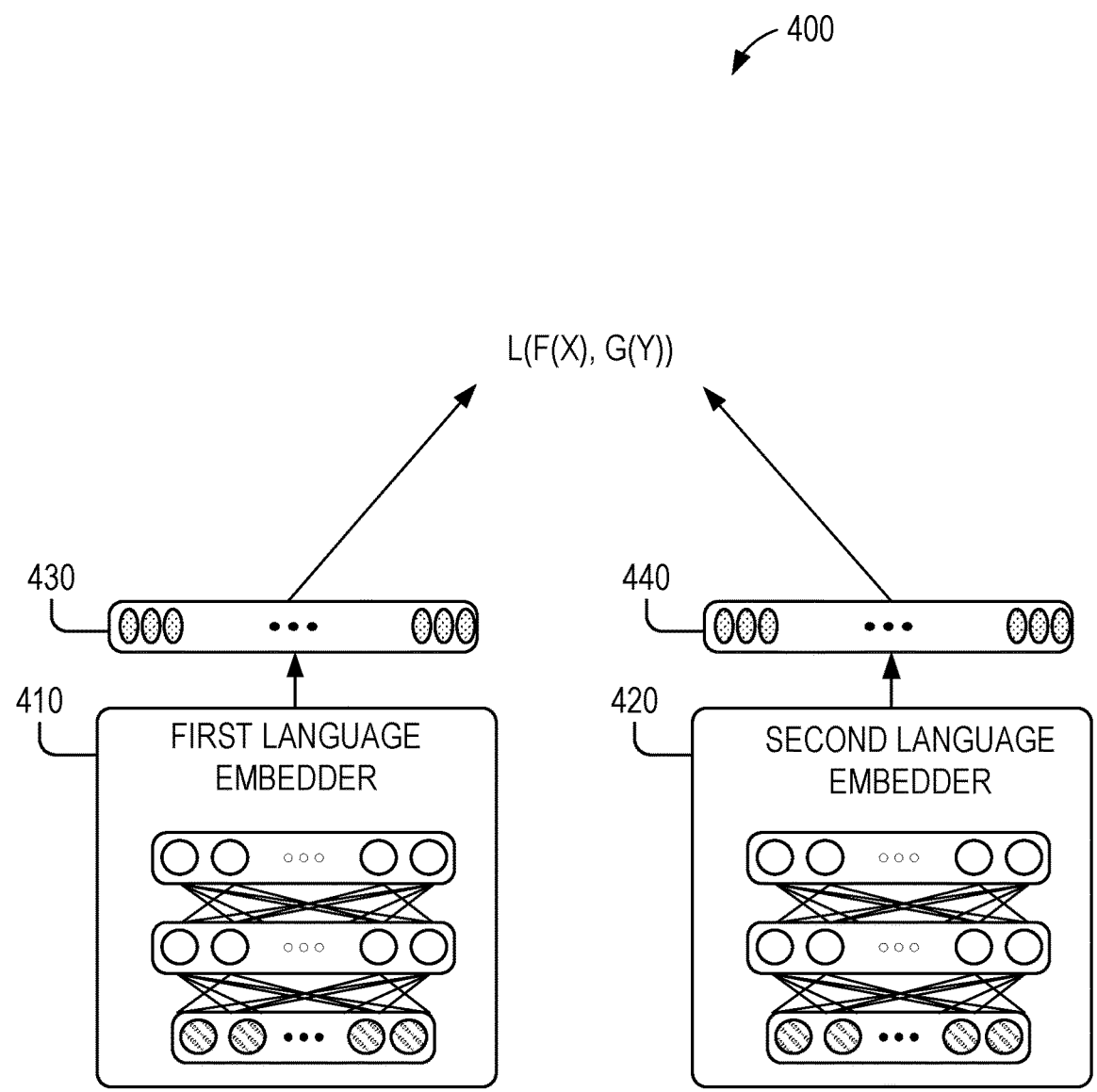
FIG. 4 is a block diagram of a pair of example neural networks, suitable for training the neural networks to use similar vector representations for words of different languages with similar meanings.

FIG. 4 is a block diagram of an example model architecture 400 for aligning multilingual embeddings. The model architecture 400 includes language embedders 410 and 420 and resulting vectors 430 and 440. The language embedders 410 and 420 are trained so that the distance (or loss) function for two related text fields is reduced or minimized.

The specific architecture of the language embedders 410 and 420 may be chosen dependent on the type of input data for an embedding layer that is followed by some encoder architecture that creates a vector from the sequence. Embeddings and encoder parameters are shared between the text fields. In the simplest case the encoder stage is just element-wise average of the token embeddings.

Alternatively, the encoding may include converting pairs of words of the text to bigram vectors and combining the bigram vectors to generate a vector for the text. For example, the text "variable name" may have a corresponding vector as a bigram, rather than two separate vectors for "variable" and "name" that are combined. The text "This function returns the location of the object" may be stripped of articles and prepositions and converted to vectors for each of the bigrams "this function," "function returns," "returns location," and "location object." The vector for a text string may be determined as an average of the bigram vectors for the bigrams in the text field.

Each of the language embedders 410 and 420 receives feedback based on the loss function L for outputs of the language embedders 410 and 420 generated from pairs of inputs X and Y. X is an input (e.g., a word, bigram, or phrase) in the first language. Y is an input in the second language having a corresponding meaning to X in the first language. $F(X)$ is the output of the first language embedder 410 when X is the input. $G(Y)$ is the output of the second language embedder 420 when Y is the input. Thus, when the language embedders 410 and 420 are trained to minimize the loss function L, the output vectors $F(X)$ and $G(Y)$ increase in similarity.

More than two language embedders may be simultaneously aligned, using a loss function that takes more than two parameters. Alternatively, iterative pairwise trainings may be performed until the average loss for every pair is below a threshold. As another alternative, one language embedder (e.g., the first language embedder 410) may be left unchanged during the training process, forcing all of the changes to achieve alignment to be made by the other language embedder (e.g., the second language embedder 420). The unchanging language embedder may be paired with each other language embedder without iteration.

FIG. 5 is an illustration of example source code 500 with embedded documentation, suitable for measuring documentation completeness. The source code 500 includes a header 505, a class 510, and documentation 540 for the class 510. Within the class 510 are a private class 515, variables 530 and 535, and documentation 555 for the variable 535. Within the private class 515 are a variable 520, a function 525, documentation 545 for the variable 520, and documentation 550 for the function 525. Thus, in the source code 500, many elements are documented, but documentation is missing for the private class 515 and the variable 530. Additionally, documentation is present only in English, except for a part of the documentation 550 that is in German.

In the example of FIG. 5, the documentation 540, 545, 550, and 555 are present in the form of comments embedded within the source code. Some or all of the documentation may be present in files that do not contain the source code. The documentation may be related to the source code by the use of filenames, directory structures, or keywords. For example, if the source code 500 is stored in a file named World.java, the corresponding documentation may be stored in a file named World.md in the same directory. Documentation for a code section may be preceded by the name of the code section as a keyword.

FIGS. 6-8 are block diagrams of an example database schema 600, suitable for use in measuring documentation completeness in multiple languages. The database schema 600 includes, in FIG. 6, an English mapping table 610, a German mapping table 640, and an English coverage table 670. The English mapping table 610 includes rows 630A, 630B, and 630C of a format 620. The German mapping table 640 includes rows 660A, 660B, and 660C of a format 650. The English coverage 670 includes rows 690A, 690B, and 690C of a format 680.

Each row of the English mapping table 610 contains the embedding vector for an input English word. The contents of the English mapping table 610 may be generated by the trained first language embedder 410 of FIG. 4. Once fully trained, the embeddings for a dictionary of English terms may be generated and stored in a database table for more efficient access. The embeddings may be accessed from the database table to generate vector representations of documentation in source code. Alternatively, the trained language embedder may be used to generate embeddings dynamically, without the use of the English mapping table 610. The trained language embedder may be able to generate accurate embeddings for variations of words or phrases not found in the dictionary.

The German mapping table 640 contains the embedding vectors for input German words. In the example of FIG. 6, the row 660A contains the embedding for the German equivalent to the English word of the row 630A. After alignment of the embeddings, the vectors in the rows 660A and 630A are the same or substantially similar (e.g., within a predetermined Euclidian distance). Similarly, the row 660B contains the embedding for the German equivalent to the row 630B and the row 660C contains the embedding for the German equivalent to the row 630C. Thus, equivalent documentation in German and English will generate identical or substantially similar embeddings.

Each row 690A-690C of the English coverage table 670 identifies a coverage score for an element identified in the complexity table 740 of FIG. 7. Different methods of determining the coverage score may be used. In the example of the English coverage table 670, the score is equal to the number of words of English documentation for the element, excluding articles, prepositions, and conjunctions. Thus, row 690A shows a coverage of 6 for object identifier 1. The row 760A of the complexity table 740 indicates that identifier 1 is for the element World, a class. The documentation 540 for the class World is "The type World. Extends ParentWorld and implements WorkingWorld." Since the documentation 540, excluding the article "the" and the conjunction "and," comprises six words, the coverage for the class World is 6.

Similarly, the rows 690B and 690C show, with reference to the rows 760B and 760C of the complexity table 740 and to the private class 515 and the variable 530 of FIG. 5, that the documentation coverage scores for the private class SubWorld and the variable population are both zero. This reflects the absence of documentation for these code elements.

The database schema 600 includes, in FIG. 7, a German coverage table 710 and a complexity table 740. The German coverage table 710 includes rows 730A, 730B, and 730C of a format 720. The complexity table 740 includes rows 760A, 760B, 760C, 760D, 760E, 760F, and 760G of a format 750.

The German coverage table 710 indicates the coverage scores for the German documentation of code elements. As shown in FIG. 5, there is no German documentation. Accordingly, the coverage score for each of the rows 730A-730C is zero.

Each of the rows 760A-760G of the complexity table 740 identifies the complexity and the identifier of an element in the source code, along with a weight for the element. Where applicable, an identifier of a parent of the element is also included. Thus, the row 760A contains information for the class 510 of FIG. 5, class World. The class 510 does not have a parent element, so the parent identifier is NULL. The complexity of the class 510 may be determined using various algorithms. In the example of FIG. 7, the complexity is the sum of the complexities of the child components plus one. The weight is the complexity of the object divided by the total complexity of all objects in the tree. Thus, in this example, the sum of the weights for all elements of the tree is one.

As can be seen in FIG. 5, the class 510 comprises the private class 515 and the variables 530 and 535. As shown in row 760B of the complexity table 740, the complexity of the private class 515 is five. The rows 760C and 760D show that each of the variables 530 and 535 have a complexity of one. Thus, the complexity of the class 510 is eight. Rows 760E-760G are also present in the complexity table 740, such that the total complexity for the source code is nineteen. Dividing the complexity in each row by the total complexity gives the weight in each row.

The database schema 600 includes, in FIG. 8, a documentation syntactic density table 810 and a semantic density table 840. The documentation syntactic density table 810 includes rows 830A, 830B, and 830C of a format 820. The semantic density table 840 includes rows 860A, 860B, and 860C of a format 850.

The rows 830A-830C of the documentation syntactic density table 810 indicate the language and documentation density for code elements of the source code 500. The documentation density indicates a quantity of the documentation for the code element as a fraction of the total documentation in the language. For example, the number of words or sentences of documentation for object ID 1 (the World object, by cross-reference to the complexity table 740) in English may be only 0.000519 of the total number of words or sentences of English documentation as shown in the row 830A. The sum of the documentation densities over all code elements in a language is one.

The ratio of the syntactic density of the documentation syntactic density table 810 to the weight of the complexity table 740 is a measure of the proportionality of the quantity of the documentation to the complexity of the source code element being documented. In this example, only 0.000519 of the English documentation is for the class World 510, but the weight of the class World 510 is 0.3684. The ratio of these two numbers is 0.001409, showing that a much smaller portion of the documentation is dedicated to the class World 510 than expected. In response to the value of the ratio being below a predetermined threshold (e.g., 0.95, 0.9, 0.85, 0.8, or 0.5), an alert may be generated to request additional documentation for the class World 510. By contrast, 0.0625 of the documentation is for the variable Population 530, which has a weight of 0.0526. The ratio of the two is 1.188, showing that slightly more of the documentation is dedicated to the variable Population 530 than expected. Accordingly, an indication of the adequacy of the documentation, the syntactic density of the documentation, or both may be presented.

Each row of the semantic density table 840 indicates a similarity score between the documentation and the source code for each code element in each language for which the documentation completeness is measured. A vector representation for the source code for a code element may be determined by using the language embedding in a primary language (e.g. English). A vector representation for the documentation for the code element may be determined by using the language embedding in the language in which the documentation is being measured. Each vector representation may be determined by averaging the vectors of the words comprising the code element or documentation for which the vector representation is being determined.

The similarity score may be determined by determining the cosine of the vector representation for the source code and the vector representation for the documentation. For two identical vectors, the cosine is one; for two orthogonal vectors, the cosine is zero; for two vectors pointing in opposite directions, the cosine is negative one; other relationships between the two vectors will yield other values for the cosine between one and negative one. Thus, if the similarity score is close to unity, the semantic meaning of the documentation for a code element is similar to the semantic meaning of the source code itself.

If the similarity score is lower than a predetermined threshold (e.g., 0.95, 0.9, 0.85, 0.8, or 0.5), the documentation in the language does not adequately address the code element. Thus, the rows 860A and 860C show that the semantic meaning of the documentation for World and Population only has similarity scores of 0.0002 and 0.0031. Accordingly, the quality of documentation in English may be insufficient. As a result, an alert may be generated to request revision of the documentation for the class World 510 and the variable Population 530. The row 860B shows that the semantic density of the documentation for SubWorld is 0.8121. Thus, discussion of Population may be adequate in the documentation in English, depending on the value of the predetermined threshold. Accordingly, an indication of the adequacy of the documentation, the semantic density of the documentation, or both may be presented.

For the purposes of example, only a few rows and columns are shown in each table of the database schema 600. Additional columns in one or more of the tables may serve to identify one or more of the project, source code file, author, owner, creation date, or modification date associated with the source code elements, the documentation, or both. Additional tables may also be used, such as additional mapping and coverage tables for additional languages. Alternatively, one or more tables of the database schema 600 may be combined. For example, the English coverage table 670 and the German coverage table 710 may be combined into a single coverage table with an additional column that indicates the language.

Figure 9:
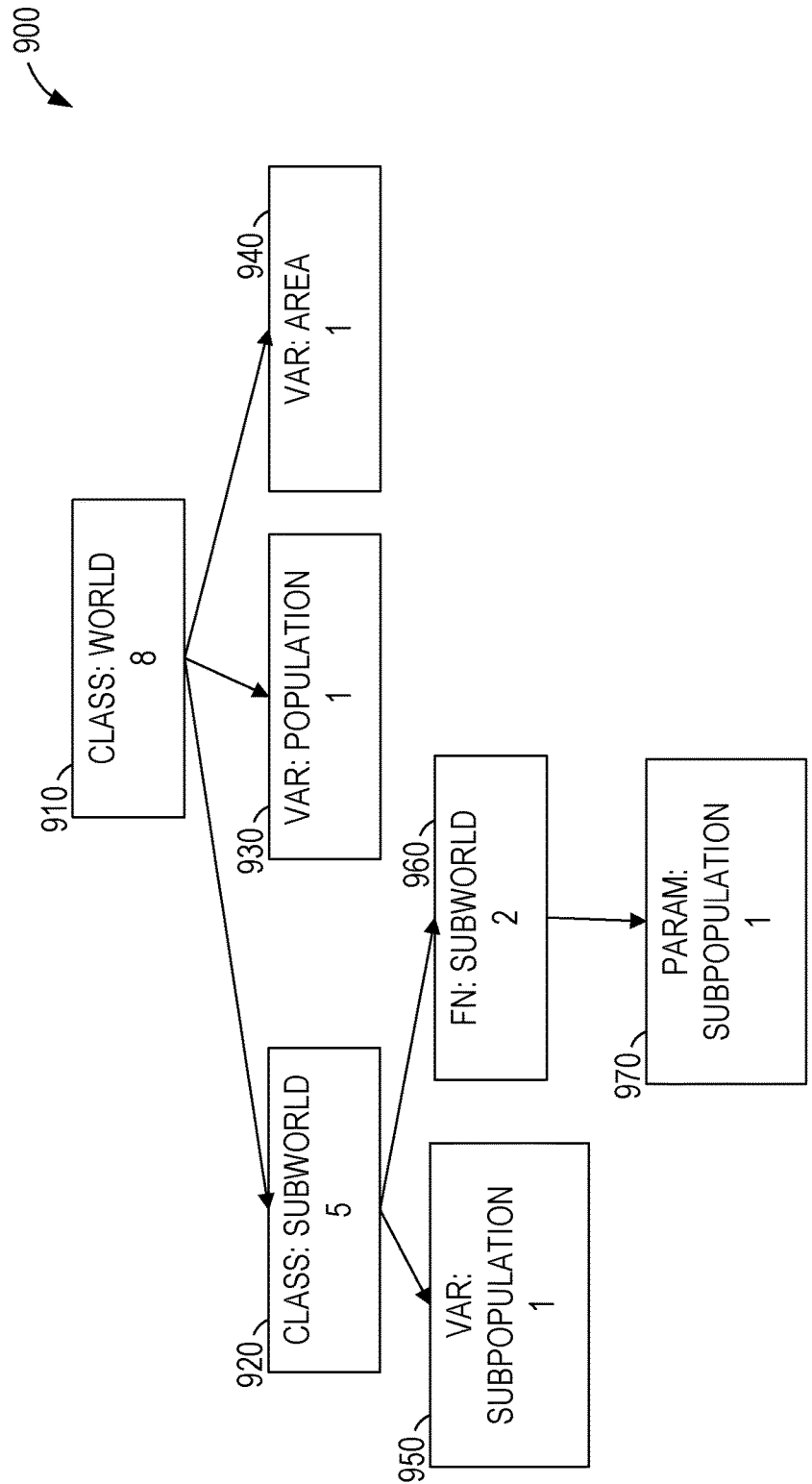
FIG. 9 is a block diagram of an example tree structure representing complexity of source code.

FIG. 9 is a block diagram of an example tree structure 900 representing complexity of source code. The tree structure 900 includes nodes 910, 920, 930, 940, 950, 960, and 970. Each of the nodes 910-970 corresponds to a code element. In addition to one node for each of the elements 515-535 of FIG. 5, a node is created for the subpopulation parameter to the SubWorld( ) function 525. Leaf nodes 930, 940, 950, and 970 have a complexity of 1. Non-leaf nodes 910, 920, and 960 have a complexity of 1 plus the sum of all of their child nodes. The nodes are organized hierarchically in accordance with the source code. Thus, since the private class 515 and the variables 530 and 535 are created within the scope of the class 510, the corresponding nodes 920-940 are child nodes of the node 910 for the class 510.

Each variable, parameter, and parameter-less function is a leaf node. Each class and parameterized function is a non-leaf node. Thus, the determining of the complexity of a code section that is a function that receives a number of parameters is based on the number of parameters. For example, the code section comprising the SubWorld( ) function 525 is represented by the node 960. The SubWorld( ) function 525 takes one parameter, represented by the node 970. The complexity of the node 970 is one, since it is a leaf node. The complexity of the node 960 is one plus the complexity of all its child nodes, which is two. If the SubWorld( ) function 525 took an additional parameter, the node 960 would have an additional child node and the complexity of the node 960 would be increased by one. Some programs may be represented by multiple disjoint trees, such as one tree for each class. The total complexity score for the program is the sum of the complexity scores of the trees.

Other methods may be used to determine the complexity of code sections. For example, McCabe cyclomatic complexity may be used. The McCabe cyclomatic complexity of a code section is the maximum number of linearly independent paths through the code section. If a code section contains no control flow statements, the complexity is one, since there is only a single path through the code. If the code section contains exactly one single-condition IF or IF/ELSE statement, the complexity is two, since either the condition is TRUE or FALSE. As the number of conditional statements in the code section increases, the number of possible paths through the code increases, which is reflected by a higher value of the McCabe cyclomatic complexity. Since it may be more difficult to fully understand code with a greater number of branching statements, more documentation may be expected for code sections with a higher McCabe cyclomatic complexity.

Hybrid methods to determine the complexity of code sections may also be used. For example, the complexity score for a function may be determined using the equation below.

$$\text{complexity}(F) = 1 + \text{count}(\text{parameters}) + \text{Cyclomatic}(F)$$

In this equation, the complexity score for a function F is one plus the number of parameters to the function plus the McCabe cyclomatic complexity of the function.

The weight of nodes corresponding to other statements (e.g., variable declarations) is one, unless conditionals are present that cause a higher cyclomatic complexity for the statement. For other nodes, in this example hybrid method, the weight is one plus the weight of all child nodes.

Figure 10:
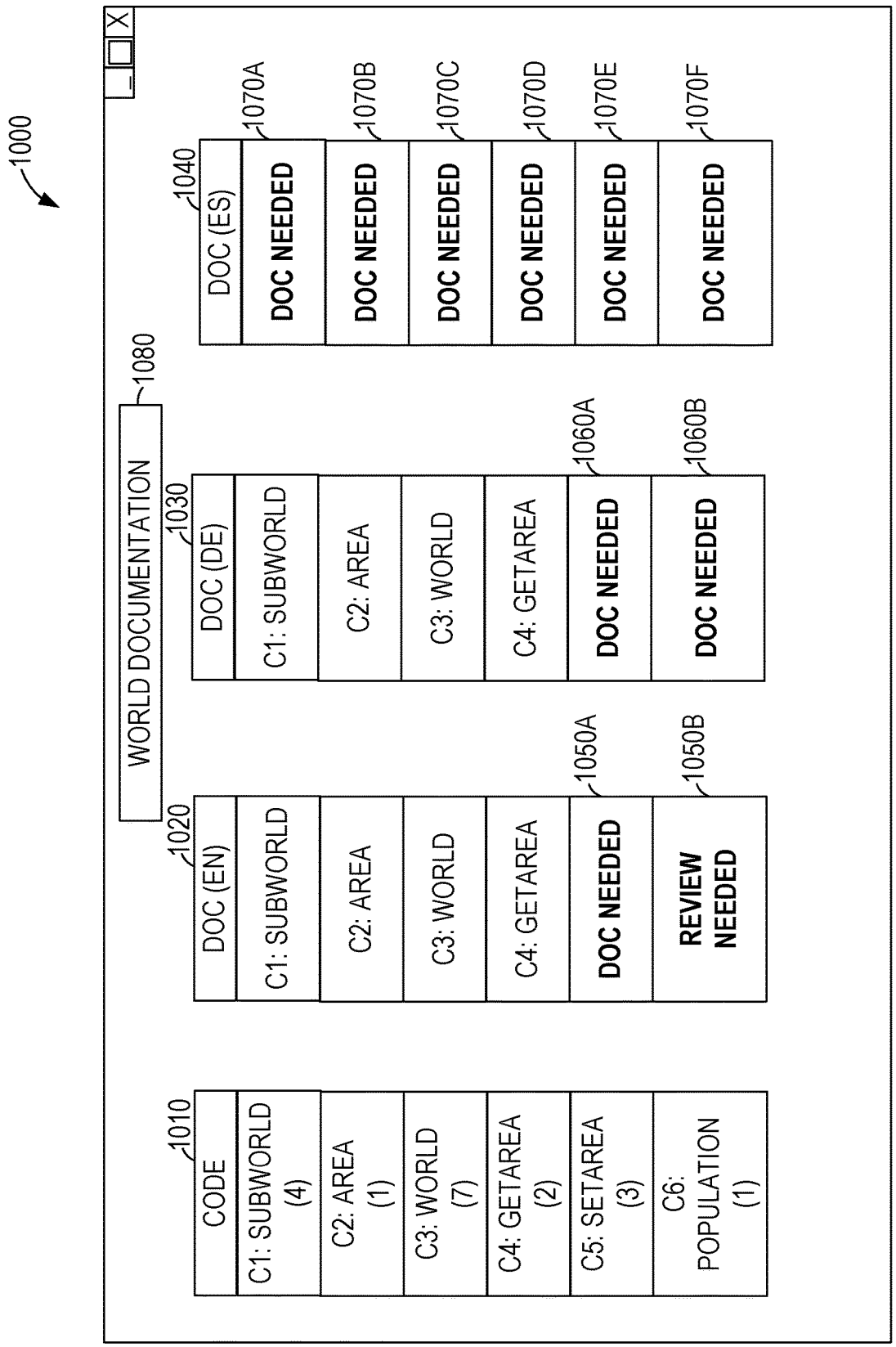
FIG. 10 is a block diagram of an example user interface for identifying portions of source code with and without documentation in each of multiple languages.

FIG. 10 is a block diagram of an example user interface 1000 for identifying portions of source code with and without documentation in each of multiple languages. The user interface 1000 includes a title 1080, informational areas 1010, 1020, 1030, and 1040, documentation needed indicators 1050A, 1060A, 1060B, 1070A, 1070B, 1070C, 1070D, 1070E, and 1070F, and review needed indicator 1050B. The user interface 1000 may be displayed on a display device of the client device 160A or 160B in response to a request from a user of the client device 160A or 160B. For example, a request may be received via a user interface, and transferred to the development server 150 via the network 190. In response, the development server 150 measures the documentation completeness in multiple languages and causes the client device 160A or 160B to display the user interface 1000.

The informational area 1010 shows the complexity scores for six code segments. The complexity scores may be stored in or retrieved from the complexity table 740.

Each of the informational areas 1020-1040 shows an indicator for each of the six code segments. The indicator indicates whether the documentation in the language for the informational area is adequate (e.g., whether the similarity in the semantic density table 840 meets a predetermined threshold, whether the ratio of the documentation density in the documentation syntactic density table 810 to the code weight in the complexity table 740 meets a predetermined threshold, or both). Where documentation is missing or inadequate, a documentation needed indicator is shown.

Each indicator may be operable to cause the display of the corresponding code or documentation. For example, clicking on the box containing "C1: SubWorld (4)" in the informational area 1010 may cause display of the source code for the private class 515. As another example, clicking on the documentation needed indicator 1070B may cause display of the documentation 555 for the variable 535. The documentation needed indicator 1070B indicates that the documentation in Spanish is inadequate. This is confirmed by inspection, revealing that the documentation 555 is solely in English.

Thus, the user may select the documentation needed indicator 1070B, add Spanish-language documentation to the documentation 555, and request redisplay of the user interface 1000. The development server 150 re-evaluates the completeness of the documentation in the multiple languages and updates the documentation indicator for the variable area in Spanish. In this way, the developer can add documentation where it is needed and see the effects of the updates in an effective user interface.

In the example of FIG. 10, different indicators are shown depending on the type of problem detected with the documentation. If the documentation is insufficient in quantity, as measured by the ratio of the syntactic density with the weight of the documented element and a predetermined threshold, a documentation needed indicator (e.g., the documentation needed indicator 1050A) is shown. If the documentation is sufficient in quantity but is not sufficiently on-topic, as measured by the similarity score of the semantic density table 840 and a predetermined threshold, a review needed indicator (e.g., the review needed indicator 1050B) is shown.

The documentation for a source code element may be initially complete and semantically similar to the documented source code. Thereafter, the source code may be revised but the documentation is not updated. As a result, the semantic similarity between the documentation and the source code is reduced. By determining that the semantic similarity no longer meets the predetermined threshold and alerting a developer in the user interface 1000, the developer is enabled to catch the mistake in failing to update the documentation.

Figure 11:
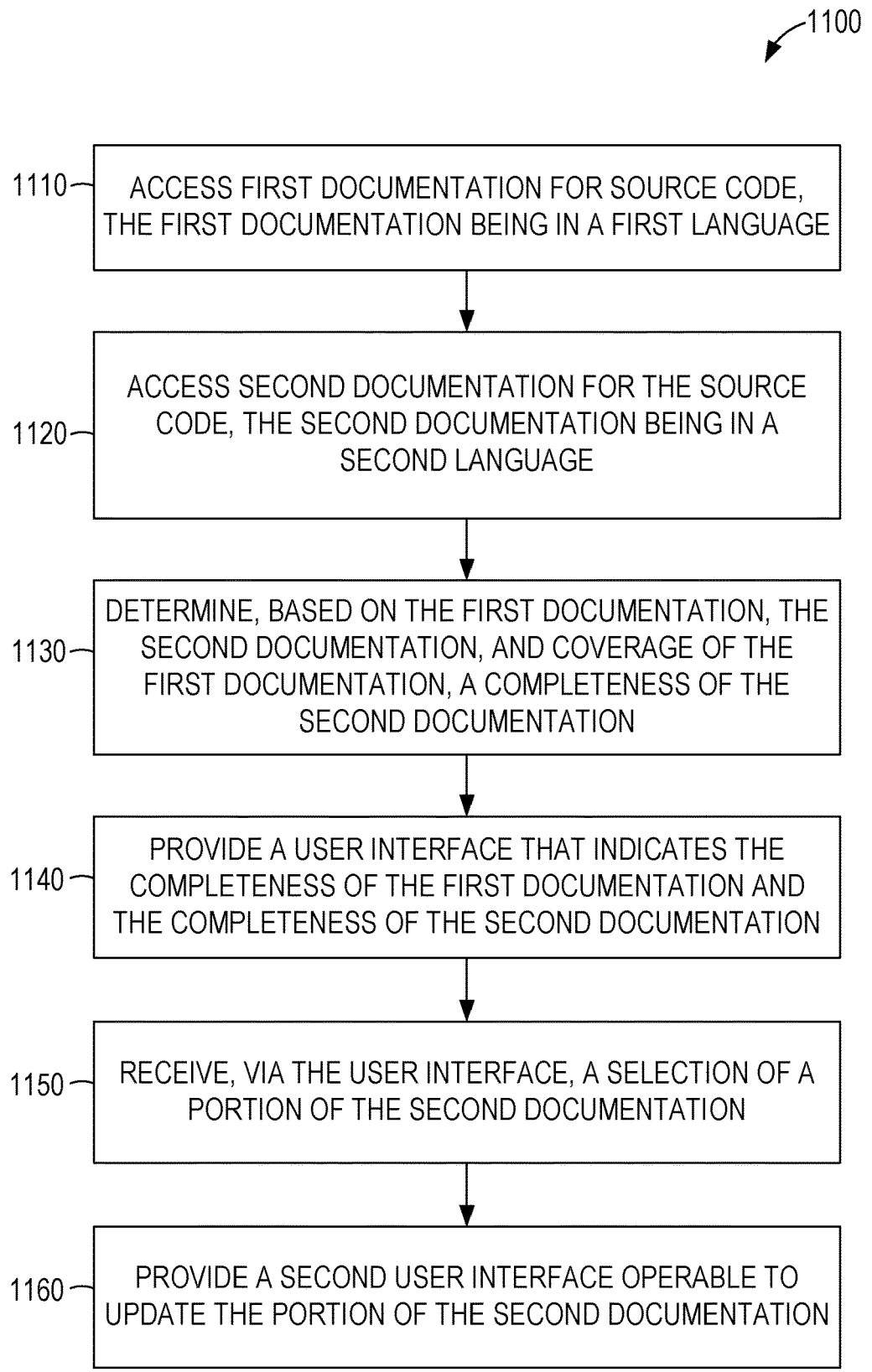
FIG. 11 is a flowchart illustrating operations of an example method suitable for measuring documentation completeness in multiple languages.

FIG. 11 is a flowchart illustrating operations of an example method 1100 suitable for measuring documentation completeness in multiple languages. The method 1100 includes operations 1110, 1120, 1130, 1140, 1150, and 1160. By way of example and not limitation, the method 1100 may be performed by the development server 150 of FIG. 1, using the modules, databases, structures, and user interfaces shown in FIGS. 2-10.

In operation 1110, the measurement module 250 of the development server 150 accesses first documentation for source code, the first documentation being in a first language. For example, the English portion of the documentation 550 for the function 525 may be accessed. The coverage of the documentation in the first language may be measured and stored in memory or in a database. For example, a row in the English coverage table 670 may be created or updated to indicate the quantity of documentation for a code element.

Measurement of the documentation may be performed by removing "stop words," commonly used words that have little impact on the meaning of the text. For example, "the," "is," and "and" are stop words in English. This saves the computation effort involved in attempting to determine the meaning of these words. The remaining words may be stemmed, reducing the vocabulary by eliminating suffixes and prefixes that indicate time or parts of speech. For example, "has," "having," and "had" may all be converted during stemming to "have." As a result, each of these natural English words will be converted to the same vector representation during embedding.

Documentation in different languages may be stored in separate files (e.g., markdown files). In this case, accessing of the documentation in the first language may be achieved by accessing the file for the first language. Alternatively, documentation in multiple languages may be stored in a single file. In this case, determination of which language is being used may be performed automatically (e.g., by looking up words in dictionaries for each candidate language and selecting the language with the highest percentage of successful lookups) or in response to an indicator in the file. For example, a documentation section in English may be preceded by an EN indicator, a documentation section in German may be preceded by a DE indicator, and so on.

The measurement module 250 of the development server 150, in operation 1120, accesses second documentation for the source code, the second documentation being in a second language. Continuing with this example, the German portion of the documentation 550 for the function 525 may be accessed.

In operation 1130, the measurement module 250 of the development server 150 determines, based on the first documentation, the second documentation, and coverage of the first documentation, a completeness of the second documentation. For example, coverage of the documentation in the second language (e.g., German) may be determined and stored in the German coverage table 710. A completeness of the second documentation is determined based on the coverage of the documentation in the first language and the coverage of the documentation in the second language. For example, the coverage in the second language may be divided by the coverage in the first language to generate a completeness score. If the completeness score is below a predetermined threshold (e.g., 0.95, 0.9, 0.85, 0.8, or 0.5), the documentation in the second language is determined to be incomplete.

The communication module 210 of the development server 150 provides a user interface that indicates the completeness of the first documentation and the completeness of the second documentation (operation 1140). For example, the user interface 1000 may be presented via the web interface 170 or the application interface 180 by the client device 160A or 160B in response to instructions and data received from the development server 150.

The development server 150 receives, in operation 1150, a selection of a portion of the second documentation. For example, the user may click on or press the documentation needed indicator 1060A or 1060B, selecting the German documentation for the function SetArea( ) or the variable population.

In operation 1160, the document module 230 provides a second user interface operable to update the portion of the second documentation. For example, a text editor may be displayed with the source code 500 and the editing cursor set to the beginning of the selected portion of the documentation. The user may save changes to the documentation and cause the method 1100 to be repeated, causing an updated version of the user interface 1000 to be presented in repeated operation 1140 and allowing the user to select the same or a different portion of documentation in the same or a different second language for editing. The method 1100 may be repeated until documentation is complete in each of a predetermined plurality of languages (e.g., English, German, Spanish, and Chinese).

Figure 12:
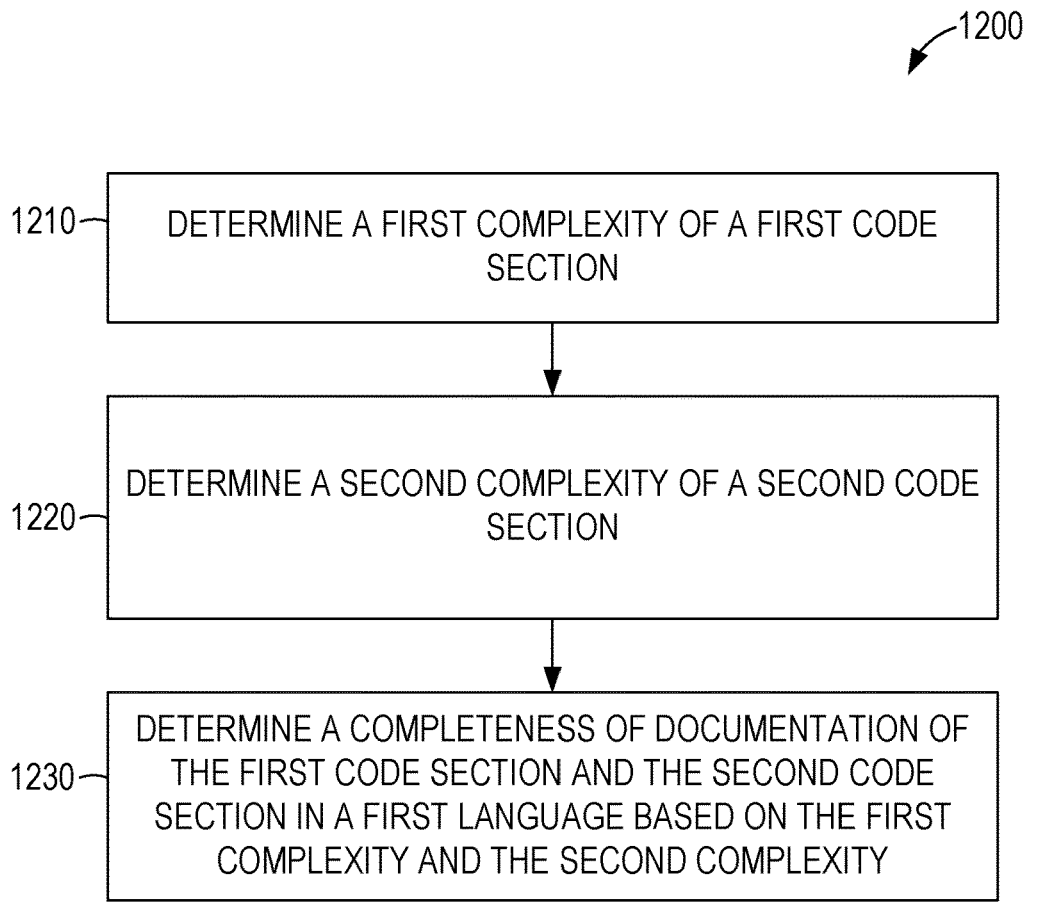
FIG. 12 is a flowchart illustrating operations of an example method suitable for measuring documentation completeness in multiple languages.

FIG. 12 is a flowchart illustrating operations of an example method 1200 suitable for measuring documentation completeness in multiple languages. The method 1200 includes operations 1210, 1220, and 1230. By way of example and not limitation, the method 1200 may be performed by the development server 150 of FIG. 1, using the modules, databases, structures, and user interfaces shown in FIGS. 2-10.

In operations 1210 and 1220, the measurement module 250 of the development server 150 determines a first complexity of a first code section and a second complexity of a second code section. For example, the tree structure 900 may be generated, determining the complexities of a plurality of code sections, any two of which may be considered the first and second code sections of the method 1200.

The measurement module 250 of the development server 150 determines, in operation 1230, a completeness of documentation of the first code section and the second code section in a first language based on the first complexity and the second complexity. For example, the coverage of the documentation in the first language of the plurality of code sections may be measured and stored in the English coverage table 670. The completeness of the documentation for each code section in the first language may be determined by dividing the coverage by the complexity.

Thus, by use of the method 1200, completeness of documentation in a language is measured not just by the coverage of the documentation for each code element, but also based on complexity measures. As a result, while a few words of description may suffice for a simple element such as a variable declaration, a greater quantity of documentation will be expected for completeness of a complex element such as a class with multiple subcomponents (e.g., private classes, functions, methods, and member variables).

Figure 13:
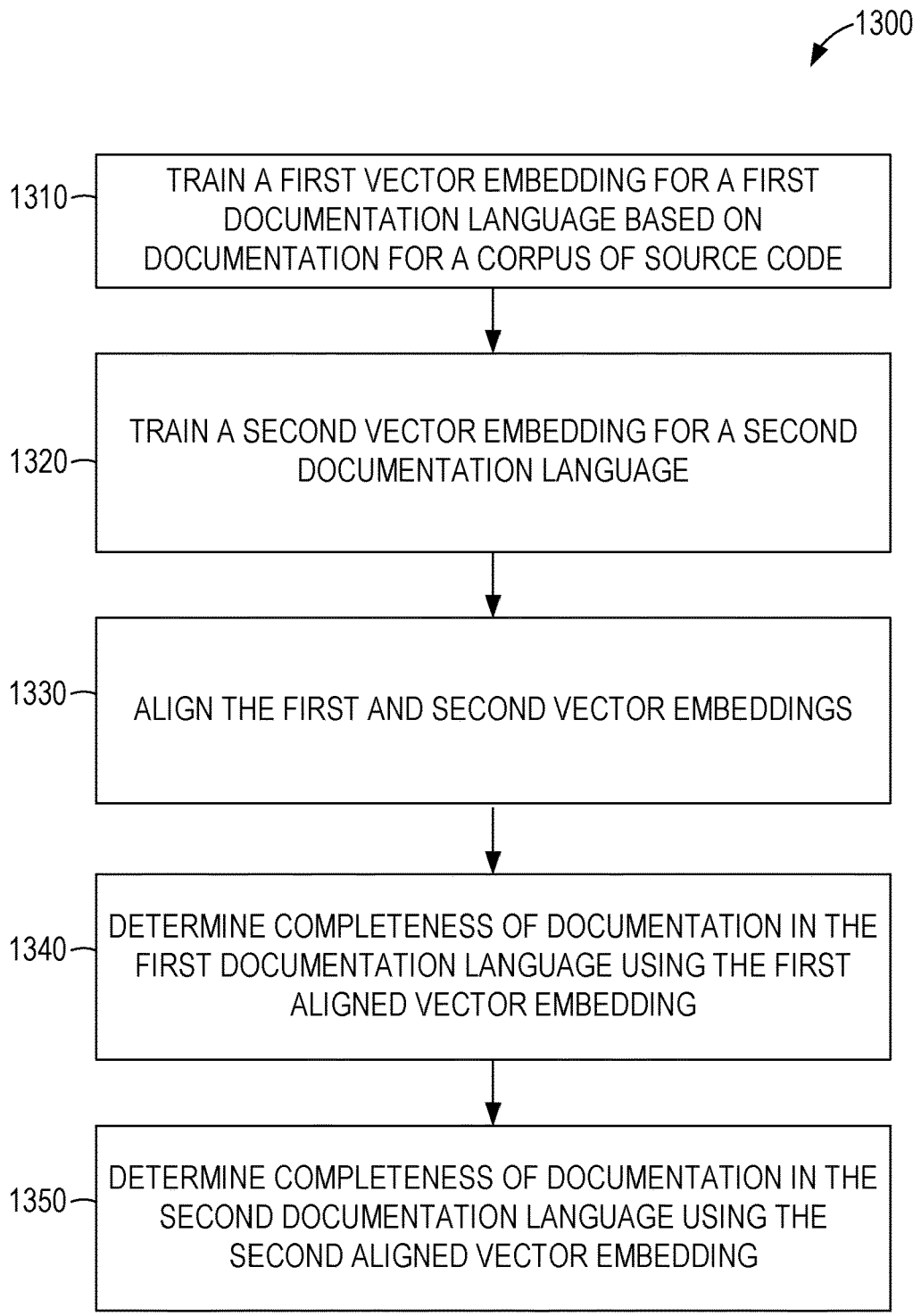
FIG. 13 is a flowchart illustrating operations of an example method suitable for measuring documentation completeness in multiple languages.

FIG. 13 is a flowchart illustrating operations of an example method 1300 suitable for measuring documentation completeness in multiple languages. The method 1300 includes operations 1310, 1320, 1330, 1340, and 1350. By way of example and not limitation, the method 1300 may be performed by the machine learning server 140 of FIG. 1, using the modules, databases, structures, and user interfaces shown in FIGS. 2-10.

In operation 1310, the machine learning server 140 trains a first vector embedding for a first documentation language based on documentation for a corpus of source code. For example, the corpus of source code may be a portion or all of the source code for the application running on the application server 120, a portion or all of the source code for one or more applications authored using the development server 150, a portion or all of the source code for one or more open source applications, or any suitable combination thereof. After training, the first vector embedding can be used to convert text in the first documentation language (e.g., English) to vector representations.

Training the first vector embedding (and other vector embeddings) may be performed by removing stop words. This saves the computation effort involved in attempting to determine the meaning of these words. The remaining words may be stemmed, reducing the vocabulary by eliminating suffixes and prefixes that indicate time or parts of speech. For example, "has," "having," and "had" may all be converted during stemming to "have." As a result, each of these natural English words will be converted to the same vector representation during embedding.

The machine learning server 140, in operation 1320, trains a second vector embedding for a second language. The training of the second vector embedding may be based on documentation for the same corpus of source code or a different corpus of source code. After training, the second vector embedding can be used to convert text in the second documentation (e.g., German) to vector representations. Operation 1320 may be repeated for a third documentation language, a fourth documentation language, and so on for any number of languages.

Given any two vectors in a vector space, a transformation can be determined to generate one from the other. The vectors of the vector embeddings may be based on semantic meaning, such that words with more similar meanings are closer together in the embedding space. Thus, the transformation between vectors for pairs of equivalent words in the two languages may be similar. For example, two English synonyms would have vector representations that are very similar and thus the transformation from one to the other would be close to unity. The German version of the two synonyms would also have similar vector representations and the transformation would also be close to unity. However, the independent training of the vector embeddings for the first language and the second language allows for the vector embeddings in the two languages to be unrelated despite the semantic similarity of the translated words.

To aid with measuring documentation completeness in multiple languages, the machine learning server 140 aligns the first and second vector embeddings (operation 1330). The alignment process causes adjustment of one or both of the first vector embedding and the second embedding to align the vectors of similar words in the two different languages to each other. In this way, the vector representation of a particular semantic meaning is consistent regardless of the language in which the meaning is expressed. Operation 1330 may be repeated to perform alignment of any additional vector embeddings generated by repetitions of operation 1320.

Optionally, prior to aligning the vector embeddings, dimensionality reduction may be performed for the vector embeddings in each language. For example, singular value decomposition (SVD) may be used to reduce the number of dimensions in the word vectors while maintaining the relative distances of the word vectors. This allows later computations to be performed less expensively (in terms of processing cycles, memory, power consumption, or any suitable combination thereof).

In operation 1340, the measurement module 250 of the development server 150 determines completeness of documentation in the first documentation language using the first aligned vector embedding. For example, the method 1100 may be used to determine the completeness of the documentation in the first documentation language.

The measurement module 250 of the development server 150, in operation 1350, determines completeness of documentation in the second documentation language using the second aligned vector embedding. The method 1100 may be repeated for the second language to determine the completeness of the documentation in the second documentation language. Operation 1350 may be repeated for any additional documentation languages.

Alternatively, comparison of a first vector representation of the documentation first documentation language with a second vector representation of the documentation in the second documentation language may be used to determine the completeness of the documentation in the second documentation language. For example, if documentation is primarily in English, the completeness of the documentation in other languages is determined by comparison with the English documentation. Thus, documentation in the primary language may be determined by the method 1100 to give a numeric score (e.g., 85%) and that score multiplied by the relative completeness (e.g., 60%) of the secondary language to give the score for the secondary language (e.g., 60% of 85%=51%).

In view of the above described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: accessing, by one or more processors, first documentation for source code, the first documentation being in a first language, the source code comprising a first code section and a second code section, the first documentation having a first completeness for the first code section, the first documentation having a second completeness for the second code section; accessing, by the one or more processors, second documentation for the source code, the second documentation being in a second language; determining, by one or more processors, based on the first documentation and the second documentation, a third completeness of the second documentation for the first code section and a fourth completeness of the second documentation for the second code section; providing, by the one or more processors, a first user interface that indicates: the first completeness of the first documentation for the first code section; the second completeness of the first documentation for the second code section; the third completeness of the second documentation for the first code section; and the fourth completeness of the second documentation for the second code section; receiving, via the first user interface, a selection of the second documentation of the second code section; and providing, by the one or more processors, a second user interface operable to update the second documentation of the second code section.

In Example 2, the subject matter of Example 1 includes, determining a first complexity of the first code section; and determining a second complexity of the second code section; wherein the determining of the third completeness is further based on the first complexity and the second complexity.

In Example 3, the subject matter of Example 2 includes, wherein: the first code section is a function that receives a number of parameters; and the determining of the first complexity of the first code section is based on the number of parameters.

In Example 4, the subject matter of Examples 2-3 includes, wherein: the determining of the first complexity of the first code section is based on a McCabe cyclomatic complexity of the first code section.

In Example 5, the subject matter of Examples 2-4 includes, wherein: the determining of the first complexity of the first code section comprises: generating a tree for the first code section, the tree comprising a plurality of nodes; and the first complexity of the first code section is based on a complexity of each node of the plurality of nodes.

In Example 6, the subject matter of Examples 1-5 includes, wherein the first documentation comprises comments within the source code.

In Example 7, the subject matter of Examples 1-6 includes, wherein the first documentation comprises documentation in files that do not contain the source code.

In Example 8, the subject matter of Examples 1-7 includes, training a vector embedding for the first language based on third documentation for a corpus of source code, the third documentation being in the first language; and determining the first completeness of the first documentation of the first code section based on the trained vector embedding for the first language.

In Example 9, the subject matter of Example 8 includes, determining a complexity of the first code section; determining a syntactic density of the first documentation of the first code section based on the trained vector embedding for the first language; wherein the determining of the first completeness of the first documentation of the first code section is based on the complexity and the syntactic density of the first documentation of the first code section.

In Example 10, the subject matter of Example 9 includes, determining a syntactic density of the first code section; wherein the determining of the first completeness of the first documentation of the first code section is further based on the syntactic density of the first code section.

In Example 11, the subject matter of Examples 8-10 includes, training a vector embedding for the second language; reducing dimensionality of the vector embedding for the first language; reducing dimensionality of the vector embedding for the second language; and aligning the vector embeddings; wherein the determining of the third completeness of the second documentation for the first code section is further based on the aligned vector embeddings.

Example 12 is a system comprising: a memory that stores instructions; and one or more processors configured by the instructions to perform operations comprising: accessing first documentation for source code, the first documentation being in a first language, the source code comprising a first code section and a second code section, the first documentation having a first completeness for the first code section, the first documentation having a second completeness for the second code section; accessing second documentation for the source code, the second documentation being in a second language; determining, based on the first documentation and the second documentation, a third completeness of the second documentation for the first code section and a fourth completeness of the second documentation for the second code section; providing, a first user interface that indicates: the first completeness of the first documentation for the first code section; the second completeness of the first documentation for the second code section; the third completeness of the second documentation for the first code section; and the fourth completeness of the second documentation for the second code section; receiving, via the first user interface, a selection of the second documentation of the second code section; and providing a second user interface operable to update the second documentation of the second code section.

In Example 13, the subject matter of Example 12 includes, wherein the operations further comprise: determining a first complexity of the first code section; and determining a second complexity of the second code section; wherein the determining of the third completeness is further based on the first complexity and the second complexity.

In Example 14, the subject matter of Example 13 includes, wherein: the first code section is a function that receives a number of parameters; and the determining of the first complexity of the first code section is based on the number of parameters.

In Example 15, the subject matter of Examples 13-14 includes, wherein: the determining of the first complexity of the first code section is based on a McCabe cyclomatic complexity of the first code section.

In Example 16, the subject matter of Examples 13-15 includes, wherein: the determining of the first complexity of the first code section comprises: generating a tree for the first code section, the tree comprising a plurality of nodes; and the first complexity of the first code section is based on a complexity of each node of the plurality of nodes.

In Example 17, the subject matter of Examples 12-16 includes, wherein the first documentation comprises comments within the source code.

Example 18 is a non-transitory computer-readable medium that stores instructions that, when executed by one or more processors, cause the one or more processors to perform operations comprising: accessing first documentation for source code, the first documentation being in a first language, the source code comprising a first code section and a second code section, the first documentation having a first completeness for the first code section, the first documentation having a second completeness for the second code section; accessing second documentation for the source code, the second documentation being in a second language; determining, based on the first documentation and the second documentation, a third completeness of the second documentation for the first code section and a fourth completeness of the second documentation for the second code section; providing, a first user interface that indicates: the first completeness of the first documentation for the first code section; the second completeness of the first documentation for the second code section; the third completeness of the second documentation for the first code section; and the fourth completeness of the second documentation for the second code section; receiving, via the first user interface, a selection of the second documentation of the second code section; and providing a second user interface operable to update the second documentation of the second code section.

In Example 19, the subject matter of Example 18 includes, wherein the operations further comprise: determining a first complexity of the first code section; and determining a second complexity of the second code section; wherein the determining of the third completeness is further based on the first complexity and the second complexity.

In Example 20, the subject matter of Example 19 includes, wherein: the first code section is a function that receives a number of parameters; and the determining of the first complexity of the first code section is based on the number of parameters.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 14:
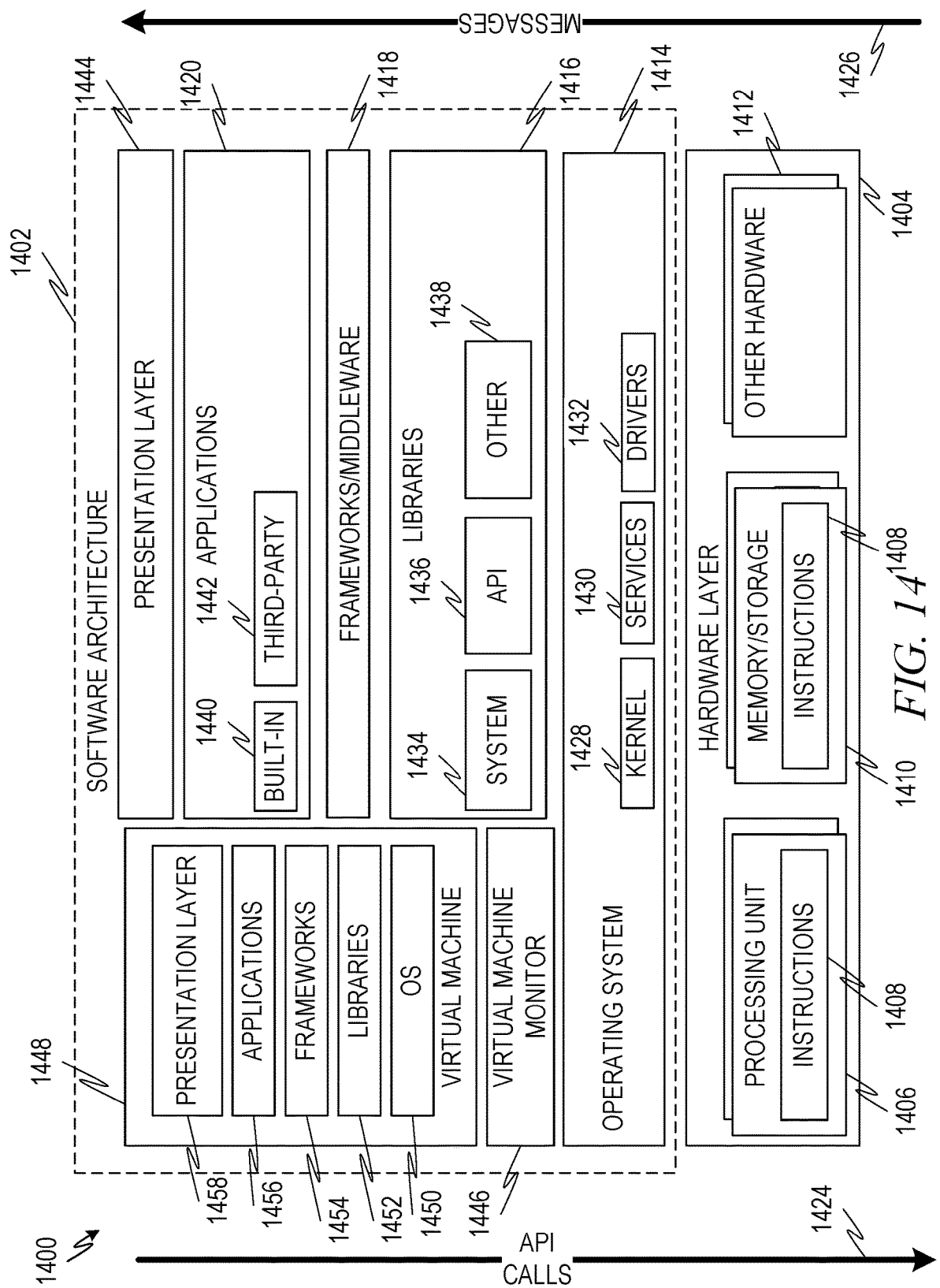
FIG. 14 is a block diagram showing one example of a software architecture for a computing device.

FIG. 14 is a block diagram 1400 showing one example of a software architecture 1402 for a computing device. The architecture 1402 may be used in conjunction with various hardware architectures, for example, as described herein. FIG. 14 is merely a non-limiting example of a software architecture and many other architectures may be implemented to facilitate the functionality described herein. A representative hardware layer 1404 is illustrated and can represent, for example, any of the above referenced computing devices. In some examples, the hardware layer 1404 may be implemented according to the architecture of the computer system of FIG. 14.

The representative hardware layer 1404 comprises one or more processing units 1406 having associated executable instructions 1408. Executable instructions 1408 represent the executable instructions of the software architecture 1402, including implementation of the methods, modules, subsystems, and components, and so forth described herein and may also include memory and/or storage modules 1410, which also have executable instructions 1408. Hardware layer 1404 may also comprise other hardware as indicated by other hardware 1412 which represents any other hardware of the hardware layer 1404, such as the other hardware illustrated as part of the software architecture 1402.

In the example architecture of FIG. 14, the software architecture 1402 may be conceptualized as a stack of layers where each layer provides particular functionality. For example, the software architecture 1402 may include layers such as an operating system 1414, libraries 1416, frameworks/middleware 1418, applications 1420, and presentation layer 1444. Operationally, the applications 1420 and/or other components within the layers may invoke application programming interface (API) calls 1424 through the software stack and access a response, returned values, and so forth illustrated as messages 1426 in response to the API calls 1424. The layers illustrated are representative in nature and not all software architectures have all layers. For example, some mobile or special purpose operating systems may not provide a frameworks/middleware 1418 layer, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. In some examples, the services 1430 include an interrupt service. The interrupt service may detect the receipt of an interrupt and, in response, cause the architecture 1402 to pause its current processing and execute an interrupt service routine (ISR) when an interrupt is accessed.

The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1416 may provide a common infrastructure that may be utilized by the applications 1420 and/or other components and/or layers. The libraries 1416 typically provide functionality that allows other software modules to perform tasks in an easier fashion than to interface directly with the underlying operating system 1414 functionality (e.g., kernel 1428, services 1430 and/or drivers 1432). The libraries 1416 may include system libraries 1434 (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The frameworks/middleware 1418 may provide a higher-level common infrastructure that may be utilized by the applications 1420 and/or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be utilized by the applications 1420 and/or other software components/modules, some of which may be specific to a particular operating system or platform.

The applications 1420 include built-in applications 1440 and/or third-party applications 1442. Examples of representative built-in applications 1440 may include, but are not limited to, a contacts application, a browser application, a book reader application, a location application, a media application, a messaging application, and/or a game application. Third-party applications 1442 may include any of the built-in applications as well as a broad assortment of other applications. In a specific example, the third-party application 1442 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 1442 may invoke the API calls 1424 provided by the mobile operating system such as operating system 1414 to facilitate functionality described herein.

The applications 1420 may utilize built in operating system functions (e.g., kernel 1428, services 1430 and/or drivers 1432), libraries (e.g., system libraries 1434, API libraries 1436, and other libraries 1438), frameworks/middleware 1418 to create user interfaces to interact with users of the system. Alternatively, or additionally, in some systems, interactions with a user may occur through a presentation layer, such as presentation layer 1444. In these systems, the application/module "logic" can be separated from the aspects of the application/module that interact with a user.

Some software architectures utilize virtual machines. In the example of FIG. 14, this is illustrated by virtual machine 1448. A virtual machine creates a software environment where applications/modules can execute as if they were executing on a hardware computing device. A virtual machine is hosted by a host operating system (operating system 1414) and typically, although not always, has a virtual machine monitor 1446, which manages the operation of the virtual machine as well as the interface with the host operating system (i.e., operating system 1414). A software architecture executes within the virtual machine 1448 such as an operating system 1450, libraries 1452, frameworks/middleware 1454, applications 1456 and/or presentation layer 1458. These layers of software architecture executing within the virtual machine 1448 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and
Machine-Readable Medium

Figure 15:
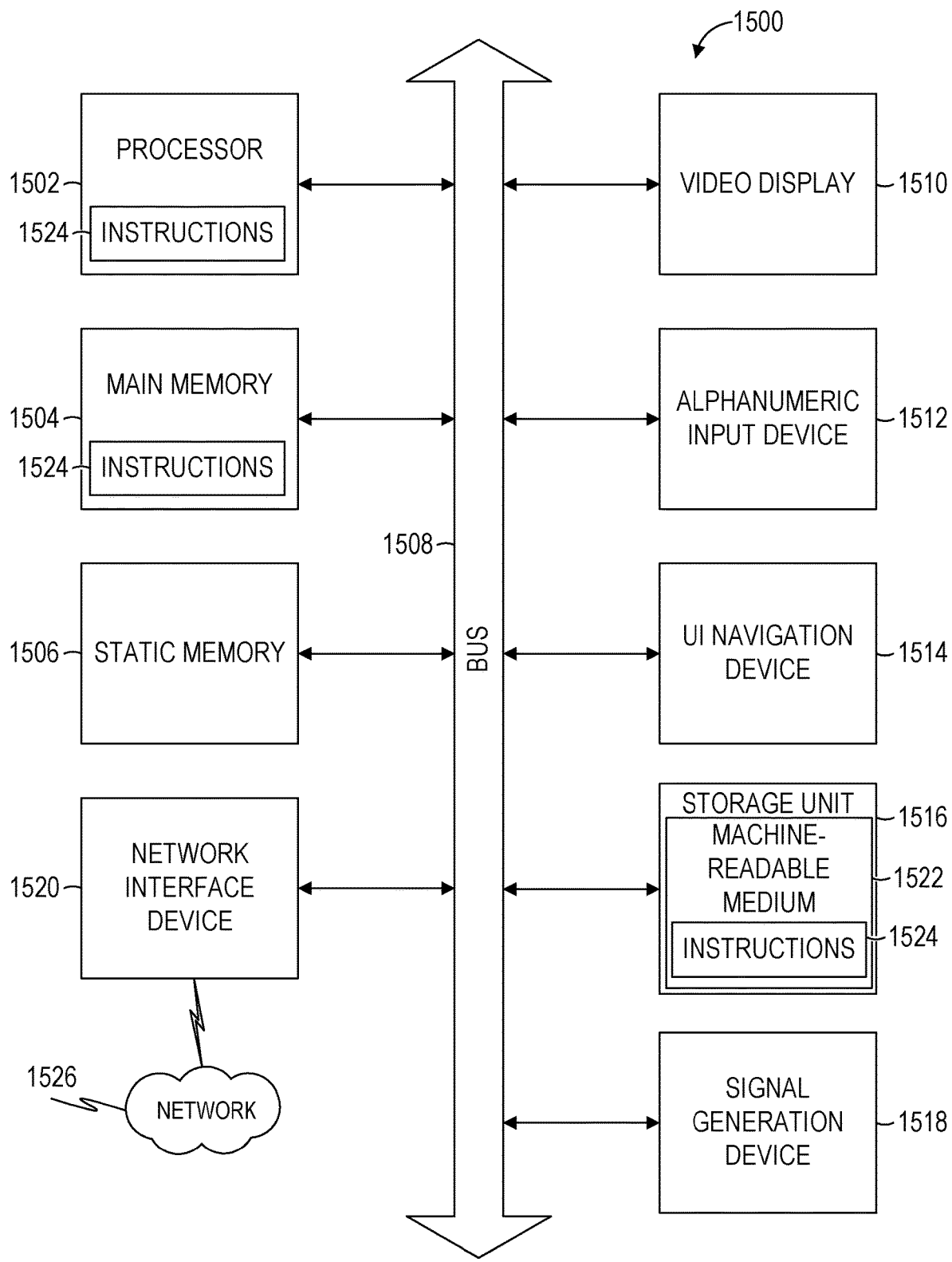
FIG. 15 is a block diagram of a machine in the example form of a computer system within which instructions may be executed for causing the machine to perform any one or more of the methodologies discussed herein.

FIG. 15 is a block diagram of a machine in the example form of a computer system 1500 within which instructions 1524 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU), or both), a main memory 1504, and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard or a touch-sensitive display screen), a user interface (UI) navigation (or cursor control) device 1514 (e.g., a mouse), a storage unit 1516, a signal generation device 1518 (e.g., a speaker), and a network interface device 1520.

Machine-Readable Medium

The storage unit 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the computer system 1500, with the main memory 1504 and the processor 1502 also constituting machine-readable media 1522.

While the machine-readable medium 1522 is shown in FIG. 15 to be a single medium, the term "machine-readable medium" may include a single medium or multiple media (e.g., a centralized or distributed database, and/or associated caches and servers) that store the one or more instructions 1524 or data structures. The term "machine-readable medium" shall also be taken to include any tangible medium that is capable of storing, encoding, or carrying instructions 1524 for execution by the machine and that cause the machine to perform any one or more of the methodologies of the present disclosure, or that is capable of storing, encoding, or carrying data structures utilized by or associated with such instructions 1524. The term "machine-readable medium" shall accordingly be taken to include, but not be limited to, solid-state memories, and optical and magnetic media. Specific examples of machine-readable media 1522 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1524 may further be transmitted or received over a communications network 1526 using a transmission medium. The instructions 1524 may be transmitted using the network interface device 1520 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1524 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
   training a vector embedding for a first language based on first documentation for a corpus of source code, the first documentation being in the first language;
   accessing, by one or more processors, second documentation for source code, the second documentation being in the first language, the source code comprising a first code section and a second code section, the first documentation having a second completeness for the second code section;
   determining a first completeness of the second documentation of the first code section based on the trained vector embedding for the first language;
   accessing, by the one or more processors, third documentation for the source code, the third documentation being in a second language;
   determining, by the one or more processors, based on the second documentation and the third documentation, a third completeness of the second documentation for the first code section and a fourth completeness of the second documentation for the second code section;
   providing, by the one or more processors, a first user interface that indicates:
      the first completeness of the second documentation for the first code section;
      the second completeness of the second documentation for the second code section;
      the third completeness of the third documentation for the first code section; and
      the fourth completeness of the third documentation for the second code section;
   receiving, via the first user interface, a selection of the third documentation of the second code section; and
   providing, by the one or more processors, a second user interface operable to update the third documentation of the second code section.

2. The method of claim 1, further comprising:
determining a first complexity of the first code section; and
determining a second complexity of the second code section;
wherein the determining of the third completeness is further based on the first complexity and the second complexity.

3. The method of claim 2, wherein:
the first code section is a function that receives a number of parameters; and
the determining of the first complexity of the first code section is based on the number of parameters.

4. The method of claim 2, wherein:
the determining of the first complexity of the first code section is based on a McCabe cyclomatic complexity of the first code section.

5. The method of claim 2, wherein:
the determining of the first complexity of the first code section comprises:
generating a tree for the first code section, the tree comprising a plurality of nodes; and
the first complexity of the first code section is based on a complexity of each node of the plurality of nodes.

6. The method of claim 1, wherein the second documentation comprises comments within the source code.

7. The method of claim 1, wherein the second documentation comprises documentation in files that do not contain the source code.

8. The method of claim 1, further comprising:
determining a complexity of the first code section;
determining a syntactic density of the second documentation of the first code section based on the trained vector embedding for the first language;
wherein the determining of the first completeness of the second documentation of the first code section is based on the complexity and the syntactic density of the second documentation of the first code section.

9. The method of claim 8, further comprising:
determining a syntactic density of the first code section;
wherein the determining of the first completeness of the second documentation of the first code section is further based on the syntactic density of the first code section.

10. The method of claim 1, further comprising:
training a vector embedding for the second language;
reducing dimensionality of the vector embedding for the first language;
reducing dimensionality of the vector embedding for the second language; and
aligning the vector embeddings;
wherein the determining of the third completeness of the third documentation for the first code section is further based on the aligned vector embeddings.

11. A system comprising:
a memory that stores instructions; and
one or more processors configured by the instructions to perform operations comprising:
training a vector embedding for a first language based on first documentation for a corpus of source code, the first documentation being in the first language;
accessing second documentation for source code, the second documentation being in the first language, the source code comprising a first code section and a second code section, the first documentation having a second completeness for the second code section;
determining a first completeness of the second documentation of the first code section based on the trained vector embedding for the first language;
accessing third documentation for the source code, the third documentation being in a second language;
determining, based on the second documentation and the third documentation, a third completeness of the second documentation for the first code section and a fourth completeness of the second documentation for the second code section;
providing, a first user interface that indicates:
the first completeness of the second documentation for the first code section;
the second completeness of the second documentation for the second code section;
the third completeness of the third documentation for the first code section; and
the fourth completeness of the third documentation for the second code section;
receiving, via the first user interface, a selection of the third documentation of the second code section; and
providing a second user interface operable to update the third documentation of the second code section.

12. The system of claim 11, wherein the operations further comprise:
determining a first complexity of the first code section; and
determining a second complexity of the second code section;
wherein the determining of the third completeness is further based on the first complexity and the second complexity.

13. The system of claim 12, wherein:
the first code section is a function that receives a number of parameters; and
the determining of the first complexity of the first code section is based on the number of parameters.

14. The system of claim 12, wherein:
the determining of the first complexity of the first code section is based on a McCabe cyclomatic complexity of the first code section.

15. The system of claim 12, wherein:
the determining of the first complexity of the first code section comprises:
generating a tree for the first code section, the tree comprising a plurality of nodes; and
the first complexity of the first code section is based on a complexity of each node of the plurality of nodes.

16. The system of claim 11, wherein the second documentation comprises comments within the source code.

17. A non-transitory computer-readable medium that stores instructions that, when executed by one or more processors, cause the one or more processors to perform operations comprising:
training a vector embedding for a first language based on first documentation for a corpus of source code, the first documentation being in the first language;
accessing second documentation for source code, the second documentation being in the first language, the source code comprising a first code section and a second code section, the first documentation having a second completeness for the second code section;
determining a first completeness of the second documentation of the first code section based on the trained vector embedding for the first language;
accessing third documentation for the source code, the third documentation being in a second language;

determining, based on the second documentation and the third documentation, a third completeness of the second documentation for the first code section and a fourth completeness of the second documentation for the second code section;

providing, a first user interface that indicates:
- the first completeness of the second documentation for the first code section;
- the second completeness of the second documentation for the second code section;
- the third completeness of the third documentation for the first code section; and
- the fourth completeness of the third documentation for the second code section;

receiving, via the first user interface, a selection of the third documentation of the second code section; and providing a second user interface operable to update the third documentation of the second code section.

18. The non-transitory computer-readable medium of claim 17, wherein the operations further comprise:
- determining a first complexity of the first code section; and
- determining a second complexity of the second code section;
- wherein the determining of the third completeness is further based on the first complexity and the second complexity.

19. The non-transitory computer-readable medium of claim 18, wherein:
- the first code section is a function that receives a number of parameters; and
- the determining of the first complexity of the first code section is based on the number of parameters.

20. The non-transitory computer-readable medium of claim 17, wherein the operations further comprise:
- determining a complexity of the first code section;
- determining a syntactic density of the second documentation of the first code section based on the trained vector embedding for the first language;
- wherein the determining of the first completeness of the second documentation of the first code section is based on the complexity and the syntactic density of the second documentation of the first code section.

\* \* \* \* \*